Figure 1:
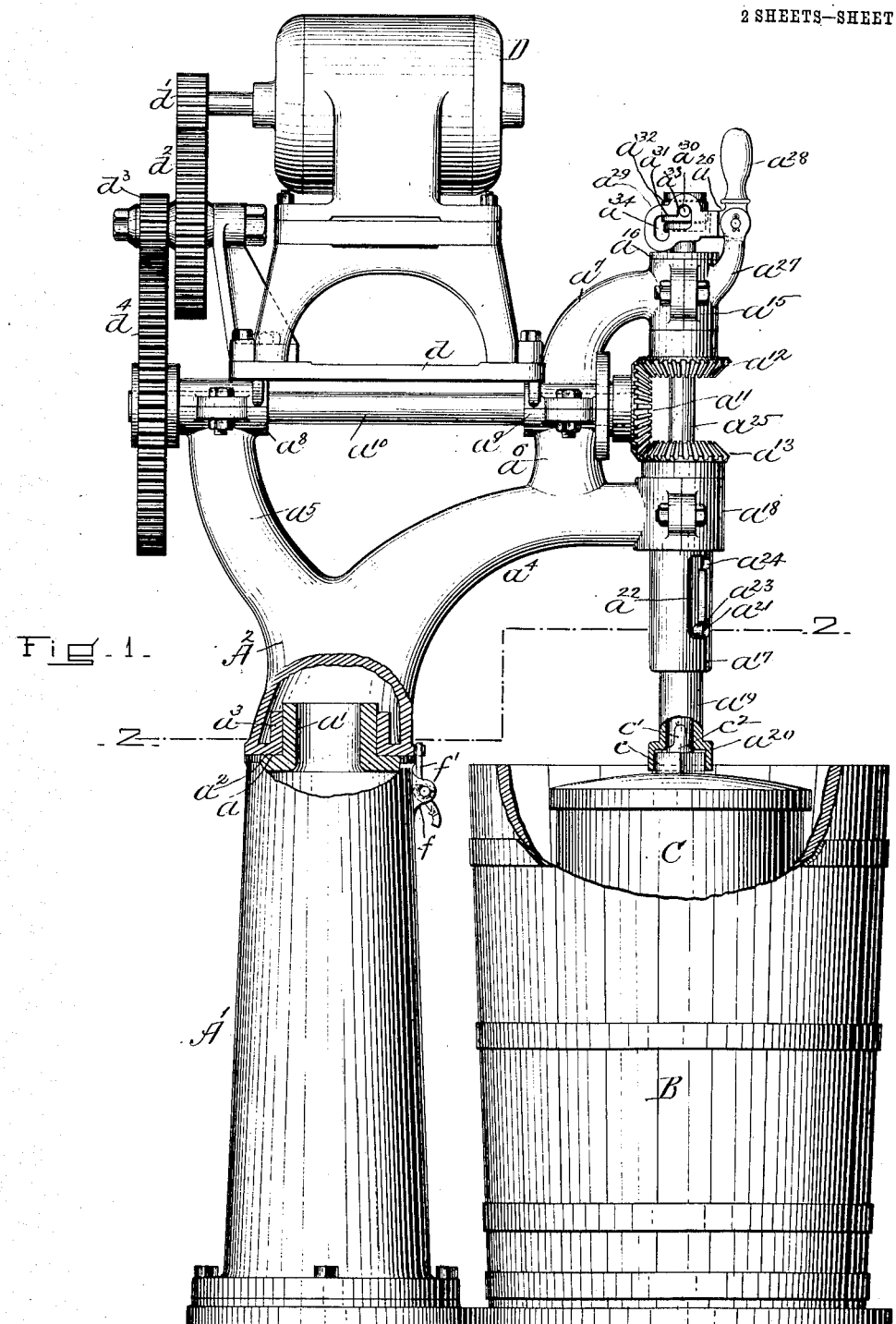

F. E. WHITNEY.
ICE CREAM FREEZER.
APPLICATION FILED JAN. 3, 1907.

916,237.

Patented Mar. 23, 1909.
2 SHEETS—SHEET 1.

F. E. WHITNEY.
ICE CREAM FREEZER.
APPLICATION FILED JAN. 3, 1907.
916,237.
Patented Mar. 23, 1909.
2 SHEETS—SHEET 2.
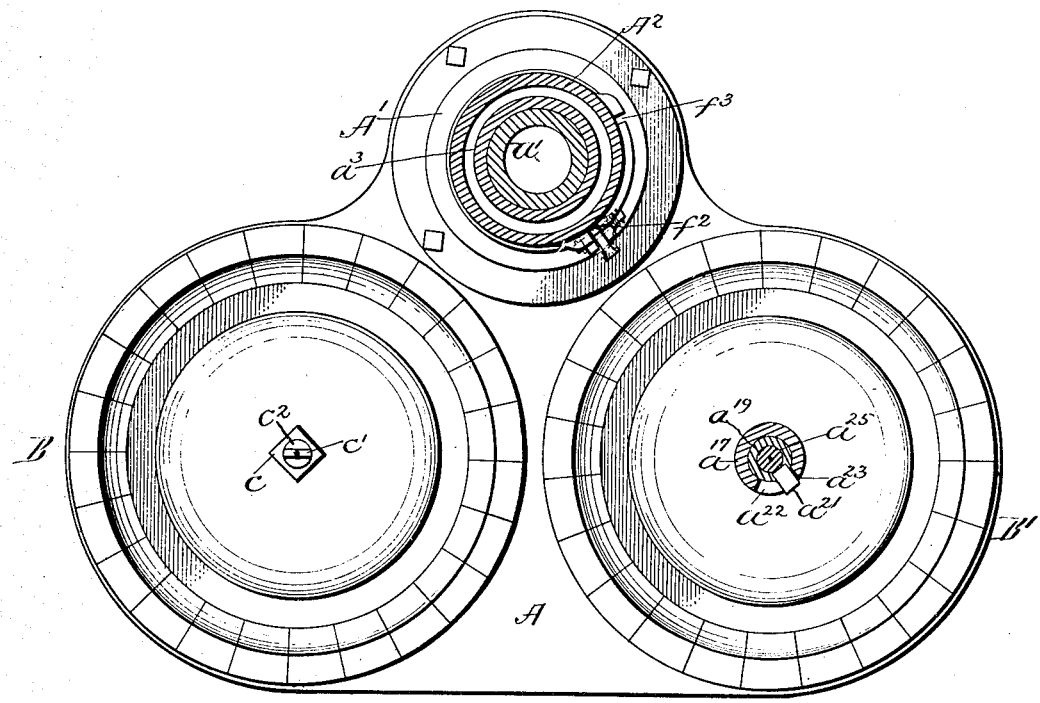
Fig. 2.
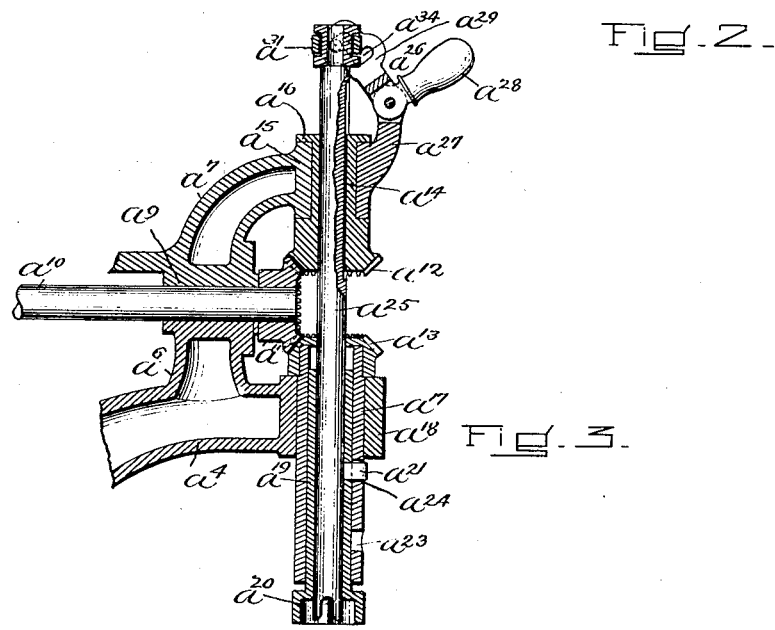
Fig. 3.
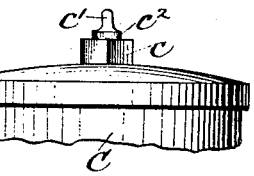
WITNESSES:
Wo. E. Flaherty.
John E. R. Hayes
INVENTOR:
Frank E. Whitney
By
Clauder Hayer Noah
Attorneys.

UNITED STATES PATENT OFFICE.

FRANK E. WHITNEY, OF MELROSE, MASSACHUSETTS.

ICE-CREAM FREEZER.

No. 916,237.   Specification of Letters Patent.   Patented March 23, 1909.

Application filed January 3, 1907. Serial No. 350,585.

*To all whom it may concern:*

Be it known that I, FRANK E. WHITNEY, of Melrose, county of Middlesex and State of Massachusetts, have invented a new and useful Improvement in Ice-Cream Freezers, of which the following is a full, clear, and exact description, reference being had to the accompanying drawings, forming a part of this specification, in explaining its nature.

My invention relates to an improvement in ice-cream freezers of that class having more than one stationary tub alternately used in connection with a single source of motive power, the contents of one tub being frozen while that of another is removed and made ready for freezing, thereby obtaining practically a continuous freezing operation.

My invention consists in various details of construction all of which can best be seen and understood by reference to the drawings, in which—

Figure 1 shows the machine mainly in side elevation. Fig. 2 is a cross section on the line 2—2 of Fig. 1. Fig. 3 shows in detail a vertical section of a portion of the machine to which special reference will hereinafter be made.

Referring to the drawings:—A represents the base of the freezer. Supported by this base are two stationary tubs B, B$^1$. Rising from the base is a standard A$^1$ provided at its upper end with an annular shoulder $a$ from which there extends upwardly and vertically a short, thick shaft $a^1$. Mounted upon the top of the standard A$^1$ is a laterally-swinging, rotatable frame A$^2$ having branching arms which support the operating mechanism, as will hereinafter be described. The swinging frame A$^2$ maintains a rotatable bearing upon the end of the standard A$^1$ by its annular bottom edge $a^2$ resting upon the annular top edge $a$ of the standard and by means, also, of a short, internal sleeve $a^3$ vertically inturned from the edge $a^2$ of the frame and adapted to embrace the shaft $a^1$ of the standard. The frame A$^2$ is provided with the forward and backwardly extending arms $a^4$, $a^5$. From the arm $a^4$ there branches upwardly an arm $a^6$, the arm $a^7$ forming practically a continuation of the arm $a^6$. On the end of the arm $a^5$ is formed a bearing $a^8$ and between the arms $a^6$ and $a^7$ is formed a bearing $a^9$. These bearings are in horizontal alinement with one another and in them is journaled a shaft $a^{10}$ carrying on its end beyond the bearing $a^9$, the beveled gear $a^{11}$ which engages with the respective gears $a^{12}$, $a^{13}$. The gear $a^{12}$ connects, preferably by an integral connection, with a short, hollow, vertically-extending shaft $a^{14}$ which turns within a bearing $a^{15}$ on the end of the arm $a^7$. The gear $a^{12}$ is maintained in proper position to engage with the gear $a^{11}$ by the body thereof engaging with the under side of the bearing $a^{15}$ and by means, also, of the collar $a^{16}$ upon the upper end of the hollow shaft $a^{14}$, which collar rests and turns upon the top of the same bearing.

The beveled gear $a^{13}$ is arranged upon the upper end of a hollow, vertically-extending, tubular shaft $a^{17}$ which turns within a bearing $a^{18}$ formed in the end of the supporting arm $a^4$. The arrangement of this gear upon the end of the shaft $a^{17}$ is such that the body of the gear will rest upon the top of the bearing, whereby the gear is maintained in proper operative engagement with the gear $a^{11}$. Within the hollow shaft $a^{17}$ is contained an auxiliary hollow shaft $a^{19}$, the bottom end of which is enlarged to form a squared cavity $a^{20}$ by which the bottom end of the hollow shaft by the squared cavity therein, may engage with a boss $c$, similarly squared, upon the covers of both the cans C contained within the tubs B and B$^1$. The auxiliary shaft $a^{19}$ is loosely arranged within the hollow shaft $a^{17}$ either to slide vertically or turn laterally therein. The auxiliary shaft serves the purpose of connecting the shaft $a^{17}$ with the can cover as aforesaid, by which the shaft $a^{17}$ may turn the can. As a means for connecting the two shafts, by which the motion of the shaft $a^{17}$ may be transmitted to the shaft $a^{19}$, admitting, also, of the sliding adjustment of the shaft $a^{19}$ to and from the can cover, there projects from the side of the shaft $a^{19}$ a pin $a^{21}$ which works within a vertically-extending slot $a^{22}$ and offset slots $a^{23}$, $a^{24}$ formed in the shaft $a^{17}$. It is obvious that by properly turning the shaft $a^{19}$ within the shaft $a^{17}$ the pin $a^{21}$ may be made to enter the slot $a^{22}$ when the shaft $a^{19}$ may be made to vertically slide within the shaft $a^{17}$ and accordingly be made to engage with or be lifted from the cover of the freezing can. The arrangement of the offset slot $a^{23}$ is such that when engagement is made with the freezing can, then upon lateral motion imparted to the shaft $a^{19}$ its pin $a^{21}$ will slip into said offset slot by which the auxiliary shaft will be held in positive engagement with the can cover and be connected also with the shaft $a^{17}$ to receive the motion thereof. The slot $a^{24}$ is adapted to receive the pin after the auxiliary shaft has been lifted into a disengaged position with respect to the cover of the can, the arrangement of the slot being such that it will then receive the pin upon laterally turning the auxiliary shaft, holding the same in its position of disengagement with respect to the can cover.

Extending vertically through the beveled gear $a^{12}$ and its hollow supporting shaft is a rod $a^{25}$. This rod extends vertically also through the gear $a^{13}$ and auxiliary shaft $a^{19}$ inside the shaft $a^{17}$ supporting said gear. The shaft $a^{25}$ is splined to the gear $a^{12}$ and its supporting shaft, to slide vertically therein and be turned rotatably thereby. The bottom end of the shaft is cleft by a slot by which the shaft may engage with a projection $c^1$ on the end of the shaft $c^2$ which connects with the dasher on the inside of each freezing can, whereby said shaft when rotated may operate to turn the dasher. By reason of its sliding maintenance, the shaft $a^{24}$ may be let down to operatively connect with the dasher, or lifted into a position of disengagement therefrom. The means provided for so engaging the shaft $a^{25}$ comprises an angular lever $a^{26}$ pivoted to a bracket $a^{27}$ arranged on the side of the bearing $a^{15}$ formed, as before described, on the end of the arm $a^7$ of the frame. This lever has a handle $a^{28}$ and a slotted arm $a^{29}$ which engages with or receives a pin $a^{30}$ on the side of the collar $a^{31}$ loosely arranged on the end of the shaft $a^{25}$ and movable vertically therewith.

The slots in the arm $a^{29}$ receiving the pin $a^{30}$, consist of a slot $a^{32}$ and slots $a^{33}$, $a^{34}$ reversely offset therefrom at either end thereof. When the rod $a^{25}$ is in operative engagement with the end of the dasher rod, the pin $a^{30}$ is contained within the slot $a^{33}$ of the lever arm which by reason of the angular disposition of the lever arm holds the rod locked in such position. Upon raising the arm by turning the lever it will draw away from the pin until the pin encounters the under side of the slot $a^{32}$. As the turning of the lever is continued the arm will slip over the pin along the under side of the slot $a^{32}$ and the rod $a^{25}$ become lifted. This action continues until the rod $a^{25}$ has been lifted into a proper position of disengagement with the dasher rod when the pin will slip into the offset slot $a^{34}$ and the rod $a^{25}$ be held in such position of disengagement. Upon moving the lever in a reverse direction by lowering the slotted arm thereof, said arm will first draw away from the pin in the offset slot $a^{34}$ by which the pin on the rod $a^{25}$ is released. Then as the turning of the lever is continued the slotted arm will run over the pin $a^{30}$ along the under side of the slot $a^{32}$, permitting the rod $a^{25}$ to drop until it engages with the end of the dasher rod when the pin is again contained in the slot $a^{33}$ and the rod becomes locked in a position of engagement as before described.

The operation of the parts above described is briefly as follows:—Assuming that the rod $a^{25}$ has been let down into operative engagement with the end of the dasher rod of one of the cans and the auxiliary shaft $a^{19}$ let down to engage with the can, as before described, then upon the application of power to the shaft $a^{10}$ the rotary movement thereof will be transmitted through the beveled gear $a^{11}$ to the gears $a^{12}$ and $a^{13}$, respectively, by which said gears are turned in reverse directions. The gear $a^{12}$ being splined to the rod $a^{25}$ connected with the dasher end of the freezing can will accordingly turn said rod and dasher. The gear $a^{13}$ at the same time turning in a reverse direction will through the shaft $a^{17}$, on which it is mounted, and pin $a^{21}$, transmit its motion to the auxiliary shaft $a^{19}$ engaging with the cover of the can, which accordingly is turned simultaneously with the dasher but in a reverse direction. For turning the dasher $a^{10}$ and consequently through the train of connecting mechanism, operating the can and the dasher there is provided a motor D which is mounted upon a table $d$ carried by the swiveling frame $A^2$. The motor connects with the shaft $a^{10}$ by a chain of gears $d^1$, $d^2$, $d^3$ and $d^4$.

The swinging frame $A^2$ is maintained or locked in proper position for the mechanism carried by the frame to connect with the parts to be operated in the following manner: Pivoted to a lug $f$ on the side of the standard $A^1$ is a spring-pressed latch $f^1$. This latch is provided with an engaging arm which when the frame has been swung to such proper position that the mechanism carried by the frame may connect with the parts to be operated as aforesaid, is adapted to automatically slip into one or the other of the slots $f^2$ formed in a rib $f^3$ on the base of the swinging frame. The latch is released in the usual manner simply by turning it and lifting its engaging arm.

Having thus fully described my invention, I claim and desire to secure by Letters Patent of the United States:—

1. In an ice-cream freezing machine of the character specified, a rod rotatably driven adapted to connect with one of the parts to be operated and to be movable into a position of engagement or disengagement with respect to said part, a member loosely connecting with said rod and movable vertically therewith, and a pivoted arm having therein slots reversely arranged and an edge intermediate said slots adapted to draw under said member, substantially as and for the purposes set forth.

2. In an ice-cream freezing machine of the character specified, a rod rotatably driven adapted to connect with one of the parts to be operated and to be movable into a position of engagement or disengagement with respect to said part, a collar loosely arranged upon said rod and movable vertically therewith, a pin projecting from said collar, and a lever having a slotted arm with the slots $a^{32}$, $a^{33}$ and $a^{34}$ for receiving said pin, substantially as described.

FRANK E. WHITNEY.

Witnesses:
  W. A. LISTER,
  HELEN S. DYER.